(12) United States Patent  
Winston

(10) Patent No.: US 10,645,237 B2  
(45) Date of Patent: May 5, 2020

(54) CHARGER

(71) Applicant: Cheing L. Winston, Gwynn Oak, MD (US)

(72) Inventor: Cheing L. Winston, Gwynn Oak, MD (US)

(73) Assignee: Cheing L. Winston, Gwynn Oak, MD (US)

( * ) Notice: Subject to any disclaimer, the term of this patent is extended or adjusted under 35 U.S.C. 154(b) by 0 days.

(21) Appl. No.: 15/956,743

(22) Filed: Apr. 18, 2018

(65) Prior Publication Data

US 2019/0327364 A1 Oct. 24, 2019

(51) Int. Cl.
| | |
|---|---|
| *H04N 1/00* | (2006.01) |
| *G06F 3/0482* | (2013.01) |
| *H01M 10/0525* | (2010.01) |
| *H01M 2/10* | (2006.01) |
| *H02J 7/00* | (2006.01) |

(52) U.S. Cl.
CPC ......... *H04N 1/0035* (2013.01); *G06F 3/0482* (2013.01); *H01M 2/1016* (2013.01); *H01M 10/0525* (2013.01); *H02J 7/0021* (2013.01)

(58) Field of Classification Search
CPC ............................. H04N 1/0035; G06F 3/0482
See application file for complete search history.

(56) References Cited

U.S. PATENT DOCUMENTS

| | | | | |
|---|---|---|---|---|
| 2009/0245643 | A1* | 10/2009 | Hasegawa | H04N 1/0035 382/181 |
| 2010/0228676 | A1* | 9/2010 | Librizzi | G06Q 10/00 705/306 |
| 2012/0129577 | A1* | 5/2012 | Vaknin | H02J 7/0027 455/573 |
| 2013/0083337 | A1* | 4/2013 | Tecu | G06F 3/1204 358/1.13 |
| 2014/0266047 | A1* | 9/2014 | Robers | B60L 11/1848 320/109 |
| 2016/0359376 | A1* | 12/2016 | Zeine | H04W 4/12 |
| 2017/0318140 | A1* | 11/2017 | Sinha | H01L 23/552 |

* cited by examiner

*Primary Examiner* — Ibrahim Siddo  
(74) *Attorney, Agent, or Firm* — Baker & McKenzie LLP

(57) ABSTRACT

An apparatus includes an imaging device, a display interface, a charging interface and a processer. The imaging device is configured to obtain an image of a user device. The display interface is configured to present selections to a user of the user device and accept instructions from the user. The charging interface configured to charge the user device. The processor is configured to determine an operating system of the user device, to cause the display interface to present a charging option to the user, and to cause the charging interface to charge the user device in response to the user selecting the charging option.

20 Claims, 6 Drawing Sheets

CHARGER

BACKGROUND

Mobile devices are increasing in prevalence and importance to daily life. A person's mobile device, such as a smart phone, may provide everything from entertainment, to a replacement for keys, wallets, tickets, etc. Despite advancements in battery technology, a mobile device may still require charging throughout the day. If one is relying on the mobile device, should the mobile device run out of power, there may be significant issues. For example, if a user has adopted wallet-less living, if their mobile device becomes inoperative due to a lack of power, the user loses their access to funds. Similar issues arise in the examples of using the mobile device for tickets such as airplane boarding passes and transit passes. The issue becomes even more complicated if the user does not have the appropriate charging equipment (e.g., cables) with them.

An apparatus and method that improves access to charging while outside the home would be desirable.

BRIEF SUMMARY

The present disclosure generally relates to a charging system and, in particular, a charging scanner system.

In an example, an apparatus includes an imaging device, a display interface, a charging interface and a processer. The imaging device is configured to obtain an image of a user device. The display interface is configured to present selections to a user of the user device and accept instructions from the user. The charging interface configured to charge the user device. The processor is configured to determine an operating system of the user device, to cause the display interface to present a charging option to the user, and to cause the charging interface to charge the user device in response to the user selecting the charging option.

In another example, a method includes imaging, by a scanner of a copying device, a user device of a user; presenting, by a display of the copying device, an option to charge the user device to the user; and charging the user device in response to the user selecting the option.

BRIEF DESCRIPTION OF THE DRAWINGS

Reference is now made to the following descriptions taken in conjunction with the accompanying drawings.

DETAILED DESCRIPTION

Various embodiments of a charging system are described according to the present disclosure. It is to be understood, however, that the following explanation is merely exemplary in describing the devices and methods of the present disclosure. Accordingly, several modifications, changes, and substitutions are contemplated. For example, although the present disclosure mainly describes a charging scanner, the disclosed principals may be applied to other devices.

Figure 1:
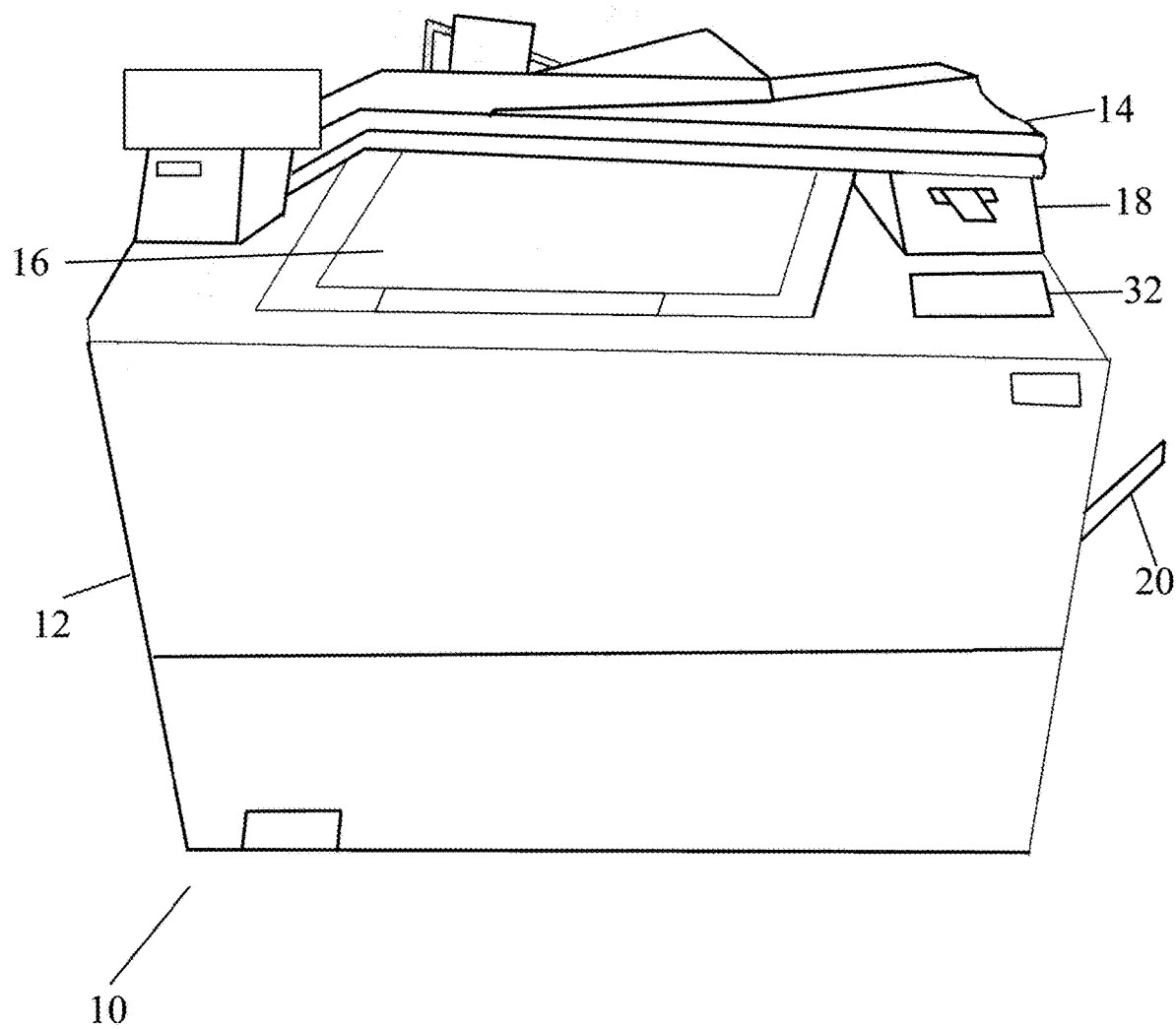
FIG. 1 is a perspective view of an exemplary charger scanner.

FIG. 1 is a perspective view of an exemplary charger scanner 10. The scanner 10 includes a main housing 12 and a top housing 14 and may provide a flatbed scanner of the type provided in a copier. In some embodiments, the charger scanner 10 includes a copier. The top housing 14 may be pivotally coupled to the main housing 12. When the top housing 14 is raised, a scanning surface 16 may be accessed. It will be appreciated that the scanning surface 16 may also be accessed in other ways or may always be accessible without the need for a top housing 14. The scanner 10 may include a small format printer 18, such as a receipt printer. The scanner 10 may also include a large format printer, such as for 8×10 paper, with print output discharge 20.

Figure 2:
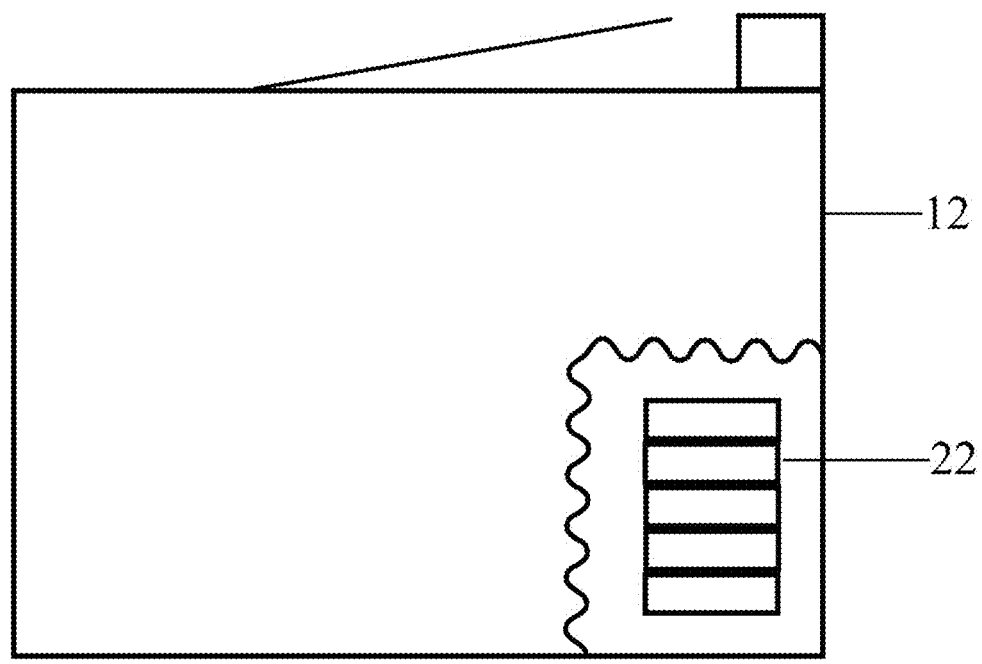
FIG. 2 is a partial cutaway front view of an exemplary charger scanner.

Referring to FIG. 2, the charger scanner 10 may include a battery pack 22. The battery pack 22 may also be provided as an external battery pack and may be provided by lithium ion batteries. The battery pack 22 provides an advantage in that the charger scanner 10 may continue to operate and charge user devices if there is a power outage. This is particularly advantageous in locations where people may gather during an emergency situation. For example, the charger scanner 10 may be disposed in a library, a fire station or an airport. Should there be a prolonged emergency situation such as a loss of power transmission during a weather event, the charger scanner 10 may continue to charge user devices to provide a communication link to others and emergency personnel.

Figure 3:
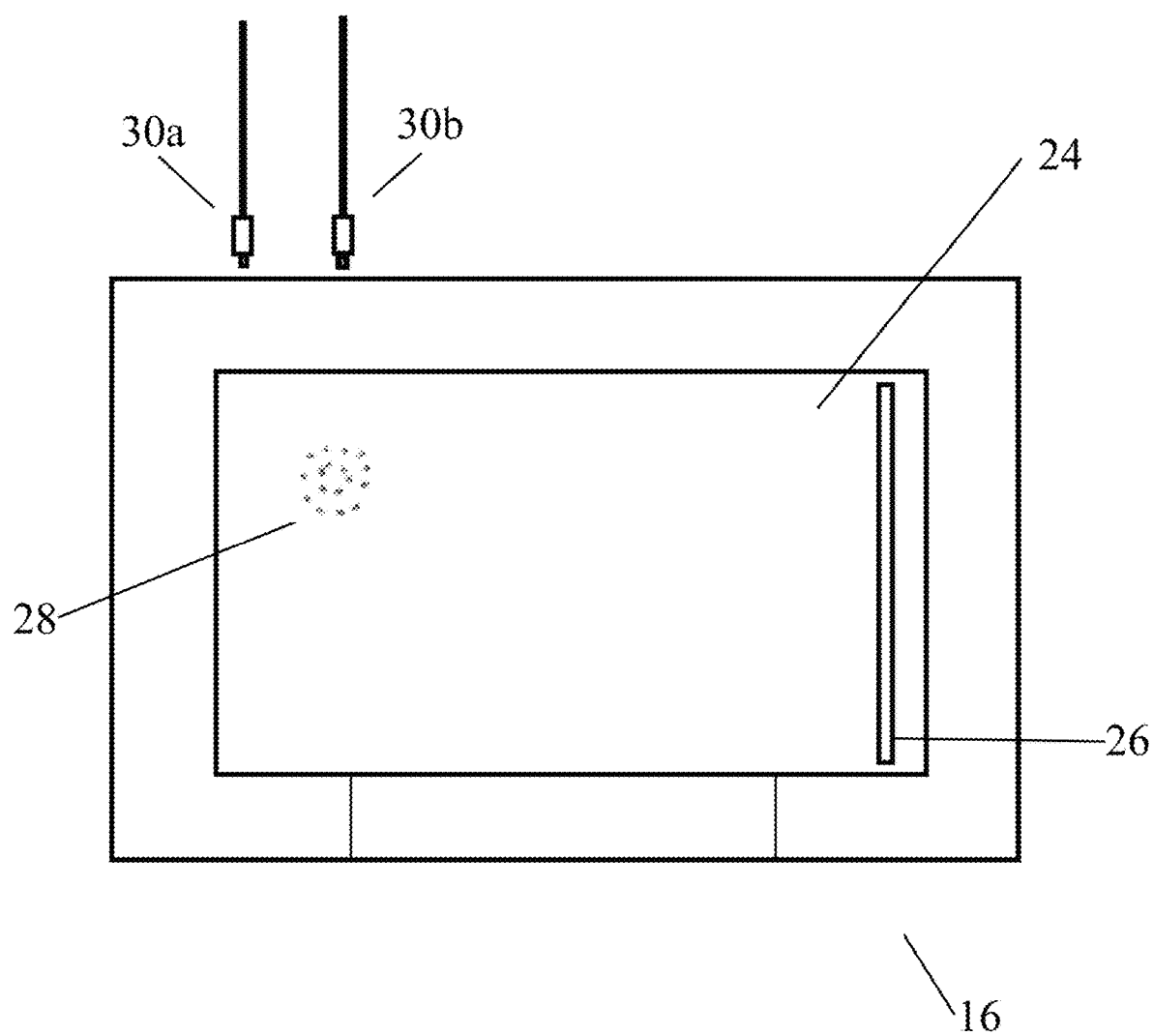
FIG. 3 is a top down view of an exemplary scanning surface.

Referring to FIG. 3, the scanning surface 16 may include a transparent panel 24 onto which the user device may be placed. An image of the user device may be captured by the scanning bar 26 travelling across the transparent panel 24, a camera disposed below the transparent panel 24, or by any other approach that can capture image information of the user device. The image information may provide identification of the operating system of the user device, the state of charge, identification information of the user, payment information and so forth.

A plurality of methods may be used to charge the user device. For example, the scanning surface 16 may be arranged to provide charging of the user device, where the scanning surface may include one or more charging coils 28 underneath or near the transparent panel 24. Additionally or alternatively, charging cables 30a, 30b, and so forth may also be disposed proximal to the scanning surface 16 and be used to charge the provide user device. The plurality of charging cables 30 may be provided to accommodate different types of user devices. For example, cable 30a may be a micro USB, 30b a lightening cable, and so on.

Figure 4:
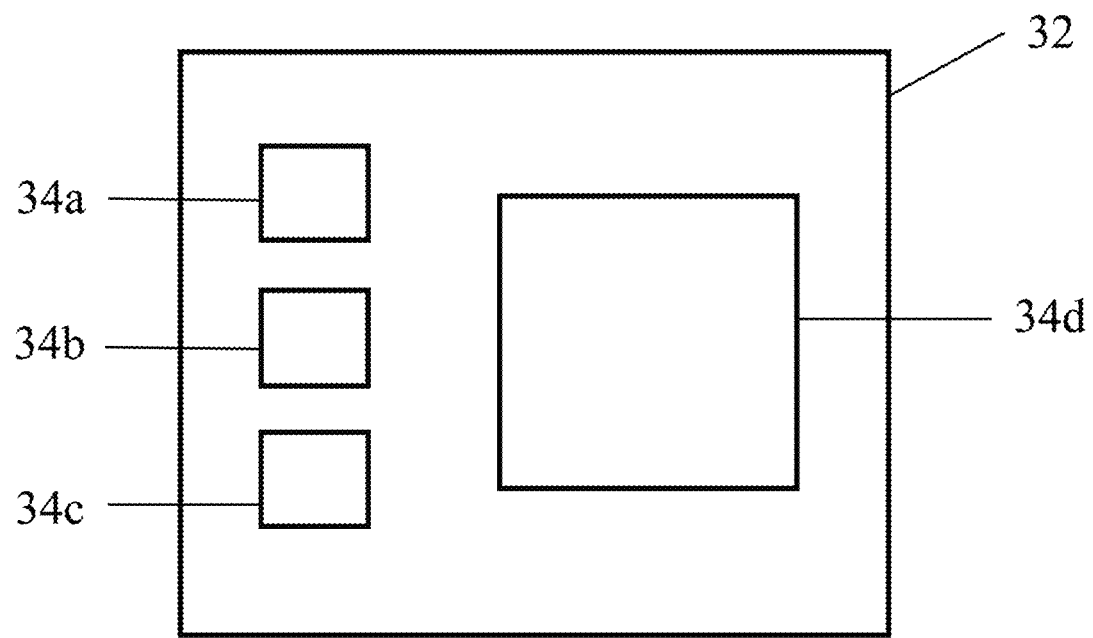
FIG. 4 is a front view of an exemplary touchscreen interface.

Referring to FIG. 4, a touch screen interface 32 includes a plurality of fields and buttons 34a-34d. The fields and buttons 34a-34d may be used to accept user input, log in information, display prompts to the user, as described in more detail below.

Figure 5:
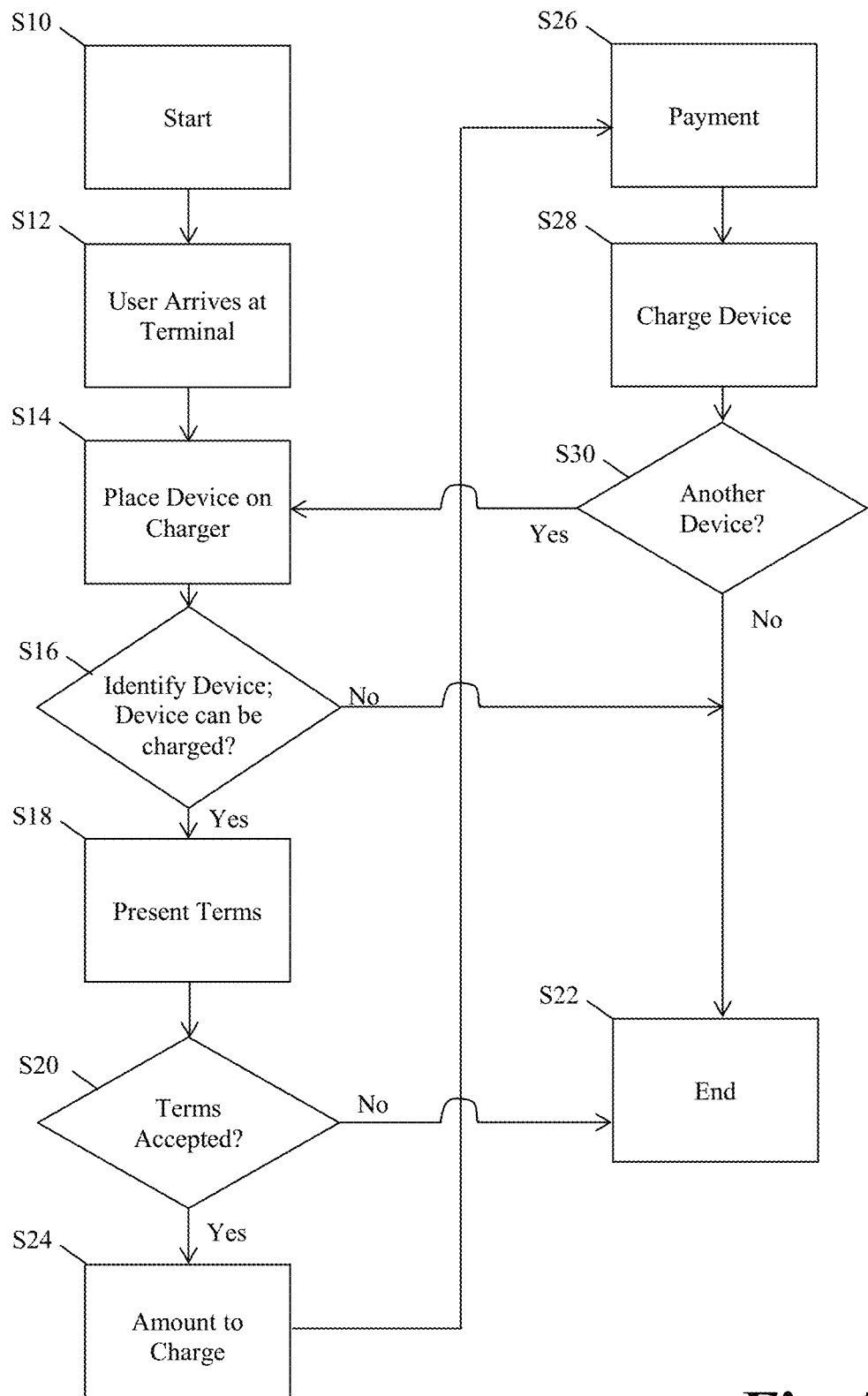
FIG. 5 is a flow chart of an exemplary charging process.

Referring to FIG. 5, a process of charging a user device by the charger scanner 10 will be described. The exemplary process begins at S10. The user arrives at a terminal of the charger scanner 10 at S12. The terminal may be a secure terminal and may be integral to the charger scanner, such as the touch screen interface 32. At S14, the user places their user device (e.g., smart phone, e-reader, tablet, gaming device, etc) on the charger scanner 10, for example on the transparent panel 24. The user device is then imaged by the charger scanner 10, for example using the scanning bar 26. Based on the acquired imaging data, the type of device, operating system, and state of charge of the user device may be determined at S16. In an embodiment, the determined device type or operating system information may affect whether the device can be charged by the charger scanner 10. For example, if the operating system cannot be determined from the imaging data (e.g. because the image is poor), the user device is damaged, or the user device is very old, the charger scanner 10 may not be able to charge the device. If it is determined that the device can be charged, the process proceeds to S18. However, if it is determined that the device cannot be charged, the user is notified and the process ends at S22. It will be appreciated that different approaches to obtain the type of device, operating system, and state of charge may be used. For example, a wireless communication link may be established between the charger scanner 10 and the user device over which the user device may transmit the information to the charger scanner. As another example, the information may be stored on a data card such as a secure digital memory card that is then inserted into and read by the charger scanner 10. A digital card reader may be disposed within or separate from the charger scanner 10 so as to read the information stored on the data card.

Terms and conditions of using the charger scanner 10 may be presented to the user, for example in the field 34d of the touch screen interface 32, at S18. If the user does not accept the terms at S20, then the process ends at S22. If the user does accept the terms at S20, then the process continues to selecting the amount to charge at S24. For example, the field 34a may provide the user the option of charging 20% of the user device's battery, the field 34b may provide the user the option of charging 50% of the user device's battery, and the field 34c may provide the user the option of charging 100% of the user device's battery. Different costs may be associated with and displayed to the user for the different available options. The degree of charging and costs may be determined based on the detected device (e.g., using image recognition to identify the device and thereby determine its battery capacity) and the operating system. The imaging data may further be used to determine a state of charge, for example by imaging a battery status indicator displayed on the user device, so that only available options are displayed to the user. For example, if the user device is currently at a 70% battery capacity, an option to charge 50% may not be displayed to the user, but options to charge 20% or a complete charge may be displayed.

Payment for the selected amount of charging is collected at S26. The payment may be provided by a separate credit card terminal, by credit card information entered into the interface 32, by services such as Square or PayPal, by wallet-less transaction systems such as Apple Pay or Google Pay, etc. Upon confirmation of the payment, a receipt is printed by the small format printer 18 or the large format printer. An electronic receipt may be provided additionally or as an alternative. The user device is then charged at S28. The charger scanner 10 may charge the device via the charger scanner 10's connection to the electric utility coupled to the user device via the highest available power link. In a power outage condition, the charger scanner may utilize the battery pack 22 as a source of power to transfer to the user device. The highest available link may be determined based on the image recognition or by communication with the device. For example, if the user device is capable of 10 W wireless transfer, the user may be prompted via the touchscreen interface 32 to position the device over the coil 28. If the user device requires wired charging, the user may be prompted via the touchscreen to connect the appropriate cable 30 to the device. The power supplied by the cable 30 may be adjusted based on the user device. For example, if the charging power limit of the user device is determined to be 15 watts at 5V, then that amount of power may be provide via the cable 30. If the charging power limit of the user device is determined to be 5 watts at 5V, then that amount of power may be provided via the cable 30. The charging power limit may be determined based on known limits of the user device associated with the type of device and operating system. During the charging process, the user may be instructed not to move the user device via the field 34d.

When charging of the user device is complete, the user may be prompted via the touchscreen interface 32 as to whether there is another device to be charged at S30. If so, the process continues to S14. If not, then the process ends at S32.

The charger scanner 10 may include a processor and one or more volatile and/or non-volatile memories storing instructions and configured to perform the above described processes. The charger scanner 10 may include wired and/or wireless communications interfaces configured to provide the communications with the user device and payment processing services described above.

Figure 6:
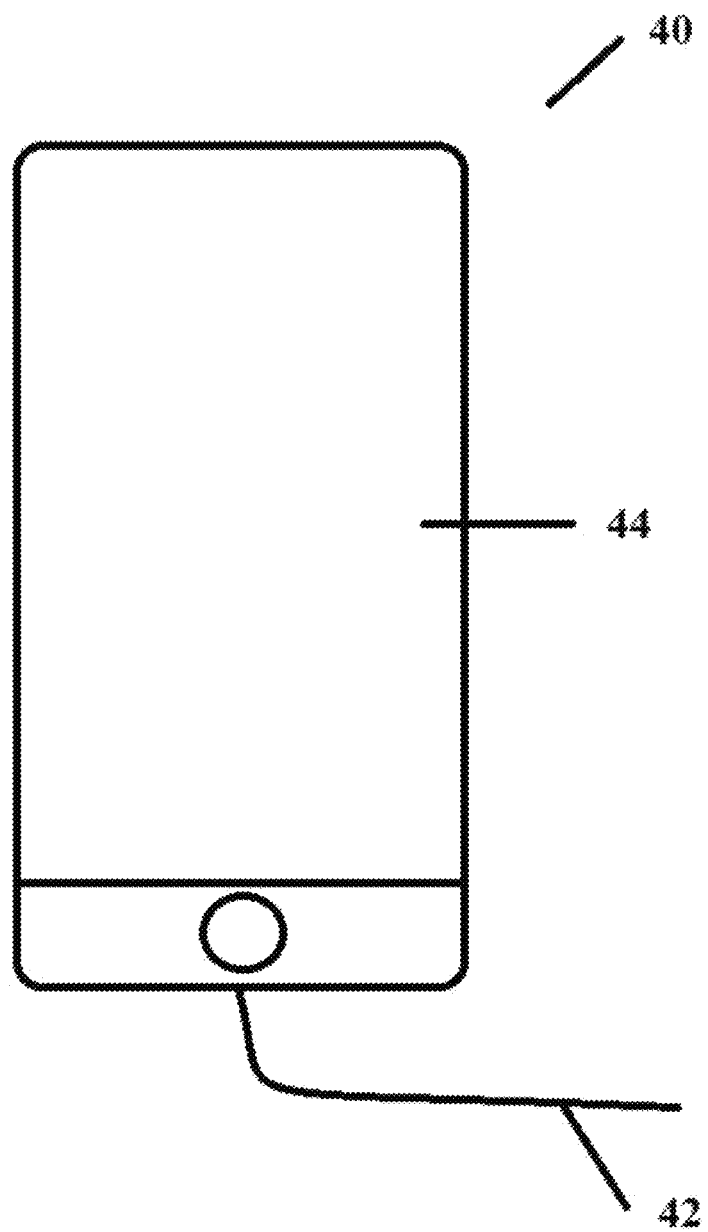
FIG. 6 is a front view of an exemplary user device.

Referring to FIG. 6, an exemplary user device 40 includes a charging interface 42 and a display 44. The user device 40 may be a smart phone.

While various embodiments in accordance with the disclosed principles have been described above, it should be understood that they have been presented by way of example only, and are not limiting. For example, the present disclosure is not limited to a charging scanner and is also applicable to other devices such as charging tables, charging televisions, charging printers, and so on. The user device that may be charged by the charging device is also not limited to mobile phones and tablets, and is also applicable to any other battery operated devices, such as a portable battery packs and cameras.

Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

What is claimed is:

1. An apparatus, comprising:
 an imaging device configured within a scanning surface to obtain an image of a user device placed on the scanning surface, the image including a battery status indicator displayed on the user device;
 a display interface configured to present selections to a user of the user device and accept instructions from the user;
 a charging interface configured to charge the user device; and
 a processor configured
  to determine an operating system of the user device using the image of the user device,
  to determine a state of charge of the user device using the battery status indicator of the image of the user device,
  to cause the display interface to present a charging option to the user, and
  to cause the charging interface to charge the user device in response to the user selecting the charging option.

2. The apparatus of claim 1, wherein the imaging device includes a scanner operable to obtain the image of the user device using a scanner bar.

3. The apparatus of claim 2, wherein the scanner includes a flatbed scanner.

4. The apparatus of claim 1, further comprising a battery.

5. The apparatus of claim 4, wherein the battery includes a lithium ion battery.

6. The apparatus of claim 4, wherein the battery is coupled to the charging interface.

7. The apparatus of claim 6, wherein the processor is configured to cause the charging interface to charge the user device using the battery when electric power to the apparatus is interrupted.

8. The apparatus of claim 1, further comprising a printer.

9. The apparatus of claim 8, wherein the processor is configured to cause the printer to print a receipt associated with an amount of power transferred to the user device during the charging.

10. The apparatus of claim 1, wherein the charging interface includes a wireless power interface configured to charge the user device wirelessly.

11. The apparatus of claim 1, wherein the processor is configured to control a power output of the charging interface based on the image of the user device.

12. A method, comprising:
   imaging, by a scanner within a scanning surface of a copying device, a user device of a user to place on the scanning surface to obtain an image of the user device including a battery status indicator of the user device;
   determining an operating system and a charging state of the user device based on the image of the user device including the battery status indicatory of the user device;
   presenting, by a display of the copying device, an option to charge the user device to the user; and
   charging the user device in response to the user selecting the option.

13. The method of claim 12, wherein the charging includes charging the user device using a wireless charging interface.

14. The method of claim 12, wherein the charging includes charging the user device from a battery storage.

15. The method of claim 14, wherein the battery storage includes a lithium ion battery.

16. The method of claim 12, wherein the imaging includes imaging the user device using a flatbed scanner of the copying device.

17. The method of claim 12, further comprising presenting a plurality of charging options and a plurality of associated charging costs to the user.

18. The method of claim 17, further comprising charging the user the charging cost associated option selected by the user.

19. The method of claim 18, further comprising printing, using a printer of the copying device, a receipt associated with the charge to the user.

20. The method of claim 12, further comprising selecting one of a plurality of available charging interfaces to charge the user device based on the charging state of the user device.

* * * * *